Figure 2:
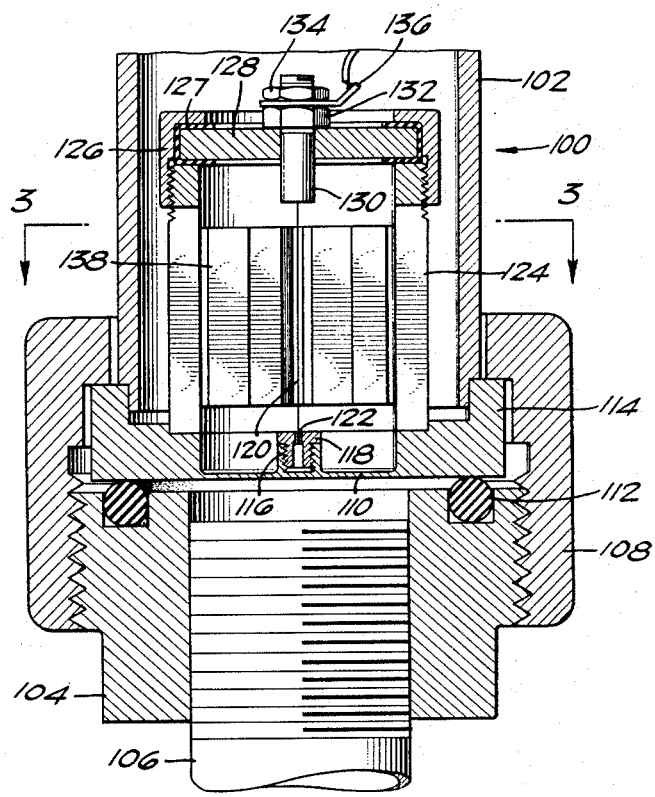

Oct. 17, 1961   C. G. PALMER ET AL   3,005,135
SERVOMOTOR CONTROL SYSTEMS EMPLOYING TRANSDUCERS
Filed June 4, 1958   2 Sheets-Sheet 1
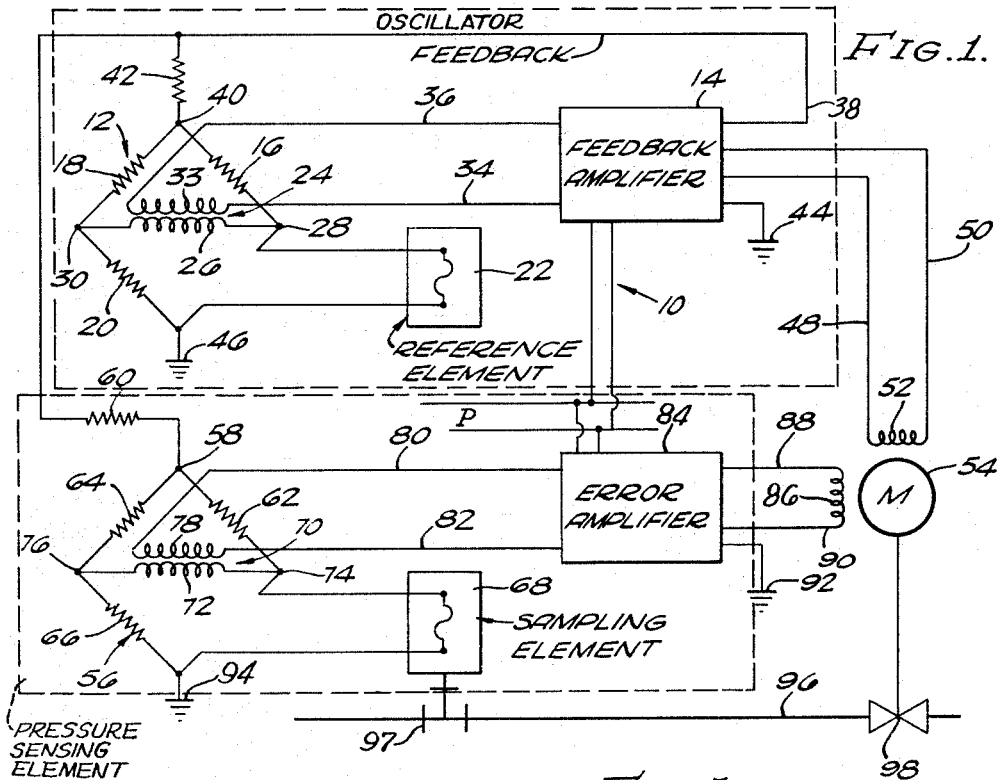
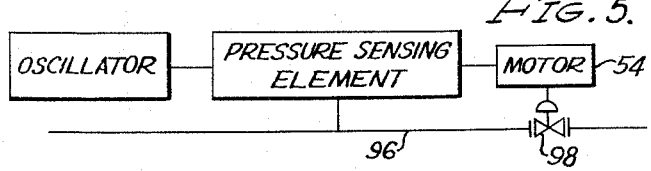
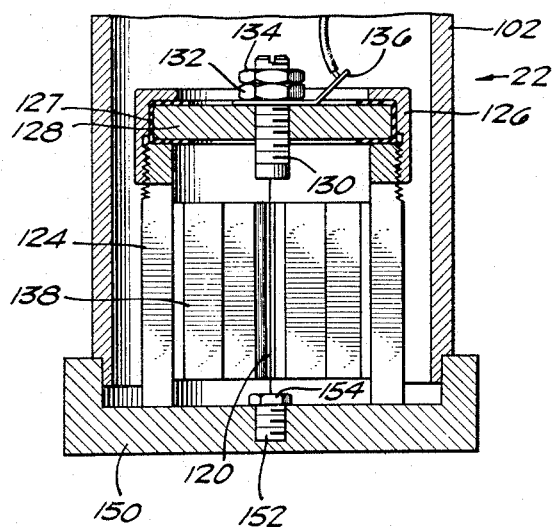
CHARLES G. PALMER.
DAVID L. PICKENS
INVENTORS
BY
ATTORNEY

CHARLES G. PALMER,
DAVID L. PICKENS
INVENTORS

BY
ATTORNEY

United States Patent Office 3,005,135
Patented Oct. 17, 1961

3,005,135
SERVOMOTOR CONTROL SYSTEMS
EMPLOYING TRANSDUCERS
Charles G. Palmer and David L. Pickens, Santa Ana, Calif., assignors to Borg-Warner Corporation, Chicago, Ill., a corporation of Illinois
Filed June 4, 1958, Ser. No. 739,799
9 Claims. (Cl. 318—29)

This invention pertains to control systems and more particularly to systems comprising frequency modulated transducers.

Under certain conditions, it is desirable to control the operation of electroresponsive devices such that the operational effect thereof is at all times substantially constant or, in the alternative, is variable throughout a given range in accordance with variation in a given condition. To this end, extensive use has heretofore been made of closed loop servo-systems wherein a follower device is caused to vary the energization of an electroresponsive device in accordance with variations in a reference device. Such arrangements generally depend upon changes in an electrical characteristic of the electroresponsive device to determine the relationship between the reference device and the follower device and hence the degree of energization of the electroresponsive device necessary to effect the desired correspondence between the follower and reference device.

Such prior devices and servo-systems including the same have not proved satisfactory for certain applications, wherefore it is an object of this invention to provide a closed loop system for controlling in a predetermined manner the condition or effect produced by an electroresponsive device.

Another object of this invention is to provide a system as characterized above which is extremely sensitive and accurate.

Another object of this invention is to provide a system as characterized above, which system employs a frequency modulated transducer for continually sensing the condition or effect produced by the electroresponsive device.

Another object is to provide in a system as characterized above, a two-phase motor having a first operating winding afforded substantially constant energization and a second operating winding associated with energizing means therefor including a condition sensitive device whereby operation of said motor is dependent upon the condition or effect produced thereby.

Another object is to provide in a system as characterized above, a feedback oscillatory system for energizing the first operating winding of the motor and a bridge network also energized from said oscillatory system and including a frequency modulated tuned element which is sensitive to the condition or effect produced by the motor, whereby the operation of said motor is controlled in accordance with the oscillating signal of said oscillatory system as compared with the condition or effect produced by said motor.

Another object is to provide in an oscillatory system of a servo-system as characterized above, a bridge network comprising a frequency modulated tuned element, said bridge network being balanced off the resonant frequency of said tuned element to afford an extremely stable oscillating signal for stable energization of the bridge network comprising the condition sensitive tuned element.

Another object is to provide a system as characterized above, wherein the bridge network including the condition sensitive frequency modulated tuned element is balanced on the resonant frequency of such tuned element whereby the output of the bridge network is proportional to the discrepancy between the frequency of the input signal thereto and the frequency of the condition responsive tuned element.

Another object is to provide a system as characterized above, wherein the condition responsive tuned element is a transducer comprising an electrically conductive string or wire which vibrates at a frequency depending upon the stress thereof, there being condition responsive means operatively associated with such wire to vary the stress of said wire in accordance with variations in a given condition.

Another object is to employ as the tuned element of an oscillatory system as characterized above, a condition responsive frequency modulated device whereby the frequency of the oscillating signal varies in accordance with variations in any desired condition whereby the condition or effect afforded by the motor is caused to follow the variations of said desired condition.

Figure 3:
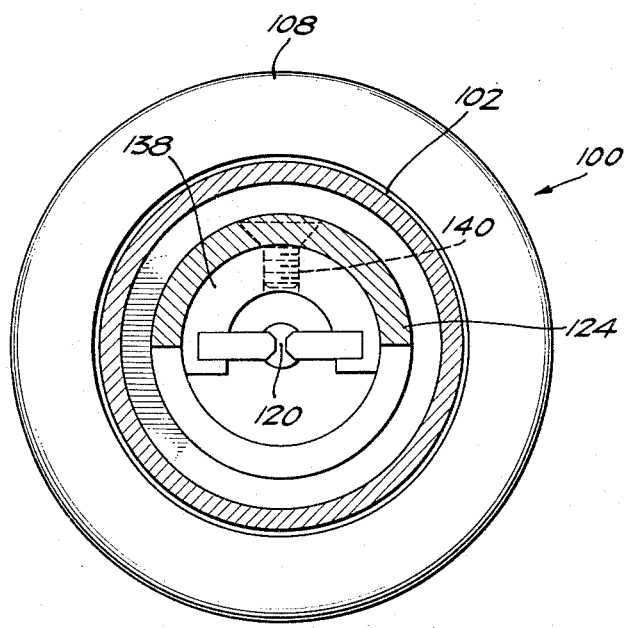

The novel features which we consider characteristic of our invention are set forth with particularity in the appended claims. The device itself, however, both as to its organization and mode of operation, together with additional objects and advantages thereof, will best be understood from the following description of specific embodiments when read in connection with the accompanying drawings, in which FIGURE 1 is a circuit diagram of a closed loop servo-system embodying the invention, FIGURE 2 is a longitudinal sectional view of a condition sensitive frequency modulated transducer for use in the system of FIGURE 1, FIGURE 3 is a transverse sectional view taken substantially along line 3—3 of FIGURE 2, FIGURE 4 is a longitudinal sectional view of a manually adjustable frequency modulated transducer for use in the system of FIGURE 1, and FIGURE 5 is a block diagram of the components illustrated in FIGURE 1.

Like reference characters indicate corresponding parts throughout the several views of the drawings.

Referring to FIGURE 1, which shows a preferred embodiment of the present invention, the numeral 10 designates an oscillatory system comprising a bridge network 12 and an electronic amplifier 14. Bridge network 12 comprises resistors 16, 18 and 20, each of which is connected in a separate one of three arms of bridge network 12. The fourth arm of such bridge network comprises a frequency modulated tuned element 22 which, in the embodiment shown in FIGURE 1, can be denoted a reference element for controlling the output of such bridge. The output of such bridge develops a signal in a transformer 24 having a primary winding 26 connected across output terminals 28 and 30 of bridge network 12. Transformer 24 further comprises a secondary winding 32 which is connected by means of conductors or lead wires 34 and 36 to the input side of amplifier 14. Electronic amplifier 14 is powered from a source P, and includes a feedback circuit 38 connected to input terminal 40 of bridge network 12 through a resistor 42. Both the amplifier 14 and the other input terminal of bridge network 12 are grounded as at 44 and 46 respectively.

The output side of amplifier 14 is connected by means of conductors or lead wires 48 and 50 to an operating winding 52 of a two-phase induction motor 54.

A sampling bridge network 56 having an input terminal 58 connected to feedback circuit 38 through a resistor 60 is provided with resistors 62, 64 and 66 in separate arms of bridge network 56 as shown in FIGURE 1. The fourth arm of bridge network 56 is provided with a condition responsive variably tuned element 68 which, in the embodiment of FIGURE 1, may be termed a sampling element or transducer. The output of bridge network 56 develops a signal in a transformer 70 having a primary winding 72 connected across output terminals 74 and 76 of bridge network 56. Transformer 70 also comprises a secondary winding 78 which is connected by means of conductors or lead wires 80 and 82 to the input side of an electronic amplifier 84 which for purposes of the herein disclosed embodiment of the invention may be termed an error amplifier. The output of error amplifier 84 is conducted to a second operating winding 86 of induction motor 54 by means of conductors or lead wires 88 and 90. Error amplifier 84 is powered from source P and is grounded as at 92. Bridge network 56 has an input terminal grounded as at 94.

As diagrammatically shown in FIGURE 1, pressure sensitive transducer 68 is associated with the condition or effect afforded by operation of motor 54. As for example and as diagrammatically depicted in FIGURE 1, operation of motor 54 may be utilized to control fluid pressure within a fluid conduit or pipe 96 as by operative association between motor 54 and a flow control valve 98 to thereby provide a motor operated valve device. Transducer 68 is shown as being connected to conduit 96 through a T connection 97. However, as will be fully realized from the hereinafter set forth operational characteristics of the present invention, particularly in view of the operability and construction of the pressure sensitive transducer 68, motor 54 could be any desired electroresponsive motivating device or sampling element operatively associated with changes in condition or effect produced thereby. The present invention, of course, is contemplated to embrace such broad scope as comes within the language and spirit of the appended claims.

The tuned elements 22 and 68 of FIGURE 1 may both take the form of frequency modulated transducer 100 shown in FIGURES 2 and 3. Such transducer is mounted within a casing comprising a tubular member 102, pressure fitting 104 for connection with a section of conduit or pipe 106, and a lock nut 108. With transducer 100 used as the tuned sampling element 68 in the arrangement of FIGURE 1, it will be seen that pressure may be admitted from conduit 96 through conduit 106 and fitting 104 so as to act against a diaphragm 110, there being a sealing ring 112 interposed between fitting 104 and member 114 out of which diaphragm 110 is formed. The reference element 22 is diagrammatically shown in FIGURE 1 as not being responsive to variations in an external condition, although it is within the scope of the present invention, as will be realized from the hereinafter set forth description of the operation of the present invention, that reference element 22 could be caused to respond to variations in an external condition, in which event such element 22 might take the form of transducer 100 shown in FIGURES 2 and 3.

Formed integrally with diaphragm 110 and disposed centrally thereof is mounting means 116 to which a nut 118 is threadably fixed. One end of an electrically conductive vibratory string or wire 120 is fixed to nut 118 at 122.

Fixed to member 114 is a body section 124 formed with threads for receiving a lock nut 126, there being a wall member 128 interposed between said body section 124 and an annular flange on nut 126. Electrical insulating material 127 is interposed between wall member 128 and each of body section 124 and lock nut 126. Positioned in a central opening formed in wall member 128 is a terminal or mounting member 130 to which is attached the other end of vibratory wire 120, said member 130 being provided with a tension or stress adjusting nut 132 and a lock nut 134, the latter of which locks member 130 in a given position and retains a connector lug 136 in place.

Disposed such that its magnetic poles or extensions thereof are on opposite sides of wire 120 to afford magnetic flux flow transverse with respect thereto, is a generally U-shaped permanent magnet 138. As shown in FIGURE 3, permanent magnet 138 is rigidly fixed to body section 124 by means such as screw 140.

The device of FIGURE 4 is somewhat similar to that of FIGURES 2 and 3 as evidenced by the use of like numerals to designate corresponding parts. However, the device of FIGURE 4 is not provided with condition responsive means, as for example diaphragm 110 and associated parts as shown in FIGURE 2, and hence is restricted to use as reference element 22 in the arrangement of FIGURE 1. In structurally distinguishing from the transducer 100, the body section 124 of transducer 22 of FIGURE 4 is fixed to a rigid wall or base member 150 which is provided with a centrally disposed threaded opening for receiving a mounting screw 152 to which is fixed at 154 one end of the vibratory wire 120. It is thus seen that transducer 22 of FIGURE 4 is not responsive to an external condition or effect as is transducer 100 of FIGURES 2 and 3. This distinction and the purpose thereof, of course, will become more apparent from the discussion of the operation of such devices in the arrangement of FIGURE 1. In this regard, connector lug 136 of transducer 22 is connected to output terminal 28 of bridge network 12 while wall or base member 150 is grounded, and connector lug 136 of transducer 100 is connected to output terminal 72 of bridge network 56 while member 114 is grounded in any desired manner.

The operation of the structure shown in FIGURE 1 is as follows:

The resistors 16, 18 and 20 of bridge circuit 12 must be selected such that bridge network 12 is balanced off the resonant frequency of vibration of wire 120 of transducer 22 as determined by the stress or tension of such wire. Such tension can be readily varied or adjusted merely by working suitable adjustment of nuts 132 and 134 on mounting member 130 of transducer 22. Thus, as long as wire 120 of transducer 22 vibrates in the magnetic field produced by permanent magnet 138, a current flow having a frequency which corresponds to the frequency of vibration of such wire is produced therein. When the frequency of the input signal to terminal 40 of bridge network 12 is the same as the frequency of the current flow in wire 120 of transducer 22, bridge network 12 is unbalanced and hence a potential is developed between output terminals 28 and 30 of such bridge network. This potential develops a signal in transformer 24, which signal is fed to amplifier 14 through lead wires 34 and 36. Such signal is accordingly amplified by amplifier 14, and a portion thereof is fed back through feedback circuit 38 and resistor 42 to input terminal 40 of bridge network 12 in a positive feedback manner. The input to bridge network 12 affords current flow through vibrating wire 120 of transducer 22, such current flow creating magnetic lines of force about wire 120 which react with the magnetic field afforded by permanent magnet 138 to sustain wire 120 in vibration at a frequency corresponding to the tension of such wire. Since bridge network 12 is so arranged as to be balanced only when the frequency of the input signal thereto differs from the frequency of vibration of the tuned element, namely vibrating wire 120 of transducer 22, only when the frequency of such input signal is the same as the frequency of vibration of such wire will a feedback signal of sufficient magnitude and of proper phase relation to the frequency of vibration of the wire be provided so as to provide an oscillator or oscillatory system.

The signal as amplified by amplifier 14 is caused to flow through operating winding 52 of motor 54, and since such oscillatory system 10 is balanced off the resonant frequency of the tuned element, the magnitude and phase of the energizing current for winding 52 is extremely stable and constant.

The feedback current of circuit 38 is also caused to flow to bridge circuit 56 through resistor 60, thus providing a very stable input thereto. Bridge network 56, however, is balanced "on" the resonant frequency of sampling tuned element 68 so that as long as the tension of vibratory wire 120 of transducer 100 (used as element 68 in arrangement of FIGURE 1) is such as to cause said wire to be tuned to the frequency of the input signal to such bridge network, no output is realized across output terminals 74 and 76 thereof. The characteristics of the string transducer 68 are analogous to the characteristics of an electrical, series-resonant, LC circuit (see, for example, a paper entitled "Vibrating Strings as Band-Pass Filters," by R. E. Johnson et al., dated September 14, 1950, which report was published by the U.S. Navy Electronics Laboratory at San Diego, California as Report 196). For this purpose, it may be assumed that the resistance is negligible. Below the resonant frequency of the LC circuit the voltage across the capacitor exceeds the voltage across the inductor and the net voltage across the entire circuit therefore lags behind the current by 90°. At resonance the voltage across the capacitor and across the inductor are equal by definition. Above the resonant frequency, the voltage across the inductor exceeds the voltage across the capacitor and the net voltage therefore leads the current by 90°. The change in phase from lagging by 90° below resonance to leading by 90° above resonance accounts for a 180° phase shift.

If the resistance is not of negligible value, the voltage will lag the current by less than 90° below resonance and will lead the current by less than 90° above resonance so that the net phase shift is less than 180°.

Thus in the string type of transducer, if the vibrating frequency of the string is below its fundamental frequency, the capacitive reactance is greater than the inductive reactance and the output voltage from the transformer 70 lags the current fed to the bridge network 56 by the oscillator. As the driving frequency of the feedback oscillator approaches the fundamental frequency of the string, the resultant impedance decreases. At resonance, the inductive and capacitive reactances are equal in magnitude and are 180° out of phase. As the driving frequency is increased beyond the fundamental frequency of the string, the inductive reactance becomes larger than the capacitive reactance and the output voltage from the transformer 70 leads the current fed to the bridge network 56 by the oscillator. However, if string 120 of transducer 100 is tuned to some frequency other than that of the input signal to bridge 56, such bridge will no longer be balanced and hence a potential, as the result of the net impedance (either capacitive or inductive) of the transducer 68 will be developed across output terminals 74 and 76 thereof. When this condition prevails, a signal is fed through lead wires 80 and 82 to error amplifier 84 where it is amplified and conducted to winding 86 of motor 54. Such error signal, as it might be termed, not only increases in magnitude with increase in frequency difference between the input to bridge 56 and the vibrations of wire 120 of transducer 100, but also the phase angle relationship between such input and the output thereof as realized in transformer 70 also increases with increase in frequency difference between such input and the vibrations of wire 120 of transducer 100. Since such input to bridge 56 is of the same phase as the energizing signal to winding 52 of motor 54, it is seen that as the frequency difference between the input to bridge 56 and the vibrations of wire 120 of transducer 100 increases so will the torque of motor 54 which is proportional to product of the voltages across windings 52 and 86 multiplied by the phase angle therebetween.

Thus, as long as the pressure in conduit 96 is such as to retain the tension of vibratory wire 120 of transducer 100 at a value which causes such wire to be tuned to the same frequency as that of the input signal to bridge network 56, motor 54 will not be energized to change the operating position of valve device 98. However, whenever the pressure in conduit 96 increases or decreases to change the tension and hence the frequency of vibration of such wire, an error signal will be developed, as aforedescribed, across the operating winding 86 of motor 54 to cause the latter to operate valve device 98 so as to change the pressure in conduit 96 such that the tension of wire 120 of transducer 100 causes such wire to vibrate at the frequency of the input signal to bridge 56.

In this manner, transducer 100 constitutes a sampling element 68 in the arrangement of FIGURE 1 by continually comparing the pressure within conduit 98 to the predetermined reference or standard afforded by transducer 22 of the oscillatory system 10. It will also be noted that the arrangement of FIGURE 1 is extremely sensitive since the speed with which motor 54 returns the conditions (pressure as herein disclosed) to the predetermined level or value is proportional to the difference between the prevailing level of such condition and the predetermined desired level because of the change in both magnitude and phase of the error signal as applied to winding 86 of motor 54 with change in discrepancy between the prevailing condition level and the predetermined desired condition level as above explained. Although not necessary to succesful practice of this invention, we prefer to arrange bridge network 56 such that operating winding 86 of motor 54 is never completely unenergized so that the entire system of FIGURE 1 is always exerting some control over the condition afforded by motor 54. As will be readily appreciated, this minimizes any tendency for the desired change in the condition to lag appreciably the operation of transducer 68.

Although transducer 22 as shown in FIGURE 4 is not responsive to external conditions, as transducer 68 necessarily must be, it is also contemplated within the scope of this invention that transducer 22 could very well be caused to change the frequency of oscillation of oscillatory system 10 in accordance with changes in any desired condition. In this event, of course, a transducer such as that shown in FIGURES 2 and 3 could be substituted in the arrangement of FIGURE 1 for the transducer 22 in bridge network 12. Under these conditions, the frequency of the feedback signal in feedback circuit 38 would be continually variable with variations in such condition and hence the frequency of the input signal to bridge network 56 would vary accordingly. Thus, the frequency of vibration of the vibratory wire of transducer 68 necessary to balance bridge network 56 would also vary in accordance with variation in the condition being sensed by the transducer of bridge network 12. In this manner, the pressure within conduit 96 would not be maintained constant, as aforedescribed, but rather such pressure would be caused to follow the condition changes sensed by the transducer of bridge network 12.

Each of transducers 68 and 22 as shown in detail in FIGURES 2 and 4 respectively is provided with manual means for adjusting the tension on the respective vibratory wires. That is, the tension on such wires can be altered as desired merely by changing the relative positions of terminal member 130 and adjusting nut 132. Such adjusting means therefore enables each of the transducers to be precisely adjusted so as to insure that the pressure within conduit 96 is controlled as desired.

Although we have shown and described certain specific embodiments of our invention, we are fully aware that many modifications thereof are possible. Our invention, therefore, is not to be restricted except insofar as is necessitated by the prior art and by the spirit of the appended claims.

What we claim is:

1. A control system comprising a source of current flow which varies at a fixed frequency, a bridge network having a transducer element comprising a prestressed electrically-conductive vibratory string in said bridge network, said bridge network being associated with said source to have an input signal the frequency of which corresponds to that of the current flow of said source and being balanced only when said element is tuned to a frequency having a predetermined relationship to the frequency of said input signal, and means associated with said bridge network to vary the condition to which said tuned element is responsive in accordance with the output of said network whereby said means is caused to maintain said condition at a predetermined value.

2. A control system comprising, a source of current flow which varies at a fixed frequency, a bridge network comprising a transducer including a prestressed string having a resonant frequency which varies in accordance with variation in the stress thereof and condition sensing means for varying said stress in accordance with variations in a condition, said network being associated with said source to have an input signal the frequency of which corresponds to that of the current flow of said source, said bridge network being balanced only when the resonant frequency of said string has a predetermined relationship to the frequency of said input signal, and condition varying means associated with said bridge network to vary said condition in accordance with the output of said network said condition varying means is caused to maintain said condition at a predetermined value.

3. A control system comprising, a source of current flow which varies at a fixed frequency, a bridge network associated with said source to have an input signal the frequency of which corresponds to that of the current flow of said source, said bridge network including a transducer comprising a prestressed electrically-conductive string mounted in a magnetic field and having vibratory movement transverse to the direction thereof, said bridge network being balanced only when said element is tuned to a frequency having a predetermined relationship to the frequency of said input signal, and means associated with said bridge network to vary the condition to which said tuned element is responsive in accordance with the output of said network whereby said means is caused to maintain said condition at a predetermined value.

4. A control system comprising, a source of current flow which varies at a fixed frequency, a bridge network associated with said source to have an input signal the frequency of which corresponds to that of the current flow of said source, said bridge network including in one of its arms a pressure sensitive element comprising a prestressed electrically-conductive vibratory string and a permanent magnet operatively positioned with respect to said string to afford magnetic flux flow in a direction transverse with respect thereto to maintain said string in vibration at a frequency corresponding to the stress in said string, said pressure sensitive element also including a pressure responsive diaphragm connected to one end of said string to vary the stress thereof in accordance with variations in pressure from a source thereof, said network being balanced only when said string is vibrating at the frequency of said input signal, and control means for the source of pressure operatively connected to said bridge network to effect variation in the pressure in accordance with the difference in bridge network input signal frequency and the frequency of vibration of said string whereby said pressure is maintained at a predetermined value.

5. A control system comprising, an oscillator having a variable frequency oscillatory signal, a bridge network comprising a pressure sensitive transducer element and connected in circuit with said oscillator to have an input signal corresponding to said oscillatory signal, said bridge network being balanced only when said element is tuned to a frequency having a predetermined relationship to the frequency of said input signal, and means associated with said bridge network to vary the condition to which said pressure sensitive transducer is responsive in accordance with the output of said network whereby said condition is caused to vary in accordance with variation in the frequency of the oscillatory signal of said oscillator.

6. A control system comprising, an oscillator having means for varying the frequency of the oscillatory signal thereof, a bridge network comprising a transducer, said bridge network connected in circuit with said oscillator to have an input signal corresponding to said oscillatory signal, said bridge network being balanced only when said transducer is tuned to a frequency having a predetermined relationship to the frequency of said input signal, and means associated with said bridge network to vary the condition to which said transducer is responsive in accordance with the output of said network whereby said condition is caused to vary in accordance with variation in the oscillating frequency of said oscillator.

7. A highly sensitive control system comprising, a source of current flow which varies at a fixed frequency, a bridge network comprising a transducer, said bridge network associated with said source to have an input signal the frequency of which corresponds to that of the current flow of said source, said bridge network being balanced only when said transducer is tuned to a frequency having a predetermined relationship to the frequency of said input signal, and a two-phase motor controlling the condition to which said transducer is responsive having a first operating winding in circuit with said source and a second operating winding in circuit with said bridge network for causing said motor to return said condition from an existing level to a predetermined level at a rate corresponding to the incremental difference between said predetermined level and the instantaneous levels of said condition throughout such return.

8. A highly sensitive control system comprising, a source of current flow which varies at a fixed frequency, a bridge network comprising a transducer, said bridge network associated with said source to have an input signal the frequency of which corresponds to that of the current flow of said source, said bridge network being balanced only when said transducer is tuned to a frequency having a predetermined relationship to the frequency of said input signal, and a two-phase motor controlling the condition to which said transducer is responsive having a first operating winding in circuit with said source to be energized with current of constant strength and frequency and a second operating winding in circuit with said bridge network to be energized by a varying signal the strength and phase of which with respect to the energizing current of said first operating winding varies directly with variation in the degree of unbalance of said bridge network, whereby said motor is caused to return said condition from an existing level to a predetermined level at a rate corresponding to the incremental difference between said predetermined level and the instantaneous levels of said condition throughout such return.

9. A control system comprising, a first bridge network having a first transducer comprising a prestressed vibratory string mounted in a magnetic field for vibratory movement transverse with respect to the direction thereof at a frequency corresponding to the stress of said string, an amplifier in circuit with said first bridge network to receive the output thereof and comprising a feedback circuit connected to the input of said bridge network to afford an input signal thereto the frequency of which matches the frequency of vibration of said string, said first bridge network being so constructed as to be balanced off the resonant frequency of said string to stabilize the frequency of the input signal to said first bridge network, a second bridge network having its input in circuit with the feedback circuit of said amplifier to receive an input signal the frequency of which matches the frequency of the input signal to said first bridge network, said second bridge network comprising a second transducer, said second bridge network being so constructed as to be balanced when said second transducer is tuned to the frequency of the input signal to said second bridge network, means responsive to the output signal of said second bridge network to vary the condition to which said second transducer is responsive whereby said second transducer controls said means in accordance with variations in said condition afforded by said means to thereby maintain such condition at a predetermined constant value.

References Cited in the file of this patent

UNITED STATES PATENTS

| | | |
|---|---|---|
| 2,265,011 | Siegel | Dec. 2, 1941 |
| 2,300,271 | Whittaker | Oct. 27, 1942 |
| 2,395,575 | Mitchell | Feb. 26, 1946 |
| 2,423,617 | Rath | July 8, 1947 |
| 2,447,817 | Rieber | Aug. 24, 1948 |
| 2,451,245 | Shenk et al. | Oct. 12, 1948 |

OTHER REFERENCES

Edson, W. A.: Vacuum Tube Oscillators, John Wiley and Sons, Inc., New York, 1953, p. 139, FIG. 7.9.